(12) United States Patent  
Cannon et al.

(10) Patent No.: US 6,603,846 B1  
(45) Date of Patent: Aug. 5, 2003

(54) METHODS AND DEVICES FOR SELECTING PREFERRED CALL BACK NUMBERS USING CID DATA

(75) Inventors: Joseph M. Cannon, Harleysville, PA (US); James A. Johanson, Macungie, PA (US); Philip David Mooney, North Wales, PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/287,644

(22) Filed: Apr. 7, 1999

(51) Int. Cl.[7] .................................................. H04M 3/42
(52) U.S. Cl. ............................. 379/142.06; 379/210.1; 379/355.1
(58) Field of Search ......................... 379/67.1, 88.11, 379/88.19, 88.2, 88.21, 88.22, 88.23, 88.24, 142.01, 142.04, 142.06, 142.17, 210.01, 355.08, 355.09, 355.1

(56) References Cited

U.S. PATENT DOCUMENTS

| | | | | |
|---|---|---|---|---|
| 4,930,152 A | * | 5/1990 | Miller | 379/214 |
| 5,283,818 A | * | 2/1994 | Klausner et al. | 379/67 |
| 5,390,236 A | * | 2/1995 | Klausner et al. | 379/67 |
| 5,671,269 A | * | 9/1997 | Egan et al. | 379/88 |
| 5,742,674 A | * | 4/1998 | Jain et al. | 379/209 |
| 5,764,731 A | * | 6/1998 | Yablon | 379/88.15 |
| 5,768,359 A | * | 6/1998 | DiPierro, Jr. et al. | 379/209 |
| 5,903,636 A | * | 5/1999 | Malik | 379/142.01 |
| 5,974,117 A | * | 10/1999 | Mahvi | 379/88.12 |
| 6,067,349 A | * | 5/2000 | Suder et al. | 379/88.19 |
| 6,094,574 A | * | 7/2000 | Vance et al. | 455/415 |
| 6,154,530 A | * | 11/2000 | Letellier | 379/142.06 |
| 6,298,128 B1 | * | 10/2001 | Ramey et al. | 379/142.01 |
| 2002/0044632 A1 | * | 4/2002 | Kaplan | 379/67.1 |

* cited by examiner

*Primary Examiner*—Scott L. Weaver  
(74) *Attorney, Agent, or Firm*—John E. Curtin; Harness, Dickey & Pierce

(57) ABSTRACT

A telephone or similar device/system may be equipped or used to select preferred call back numbers. These preferred numbers may be programmed into a device by a user. When an incoming call comprising caller identity ("CID") data is received, preferred call back numbers associated with a portion of the data are selected. A responsive, outgoing call is transmitted using one of the preferred call back numbers. The selected, preferred call back numbers may or may not be identical to a telephone number indicated in the CID data.

62 Claims, 3 Drawing Sheets

METHODS AND DEVICES FOR SELECTING PREFERRED CALL BACK NUMBERS USING CID DATA

BACKGROUND OF THE INVENTION

An incoming telephone call is made up of many different signals. Some signals contain the audio or "voice" information which allows a telephone receiver to reproduce a caller's voice. Still other signals contain identification information which identifies the source of the incoming call. This type of information is known as CID information. This information may take the form of CID data or the like. The CID data contains, among other things, data relating to the telephone number and name of the calling party, i.e., the source of an incoming call. There exists CID devices which allow the user to "automatically" call back the source of an incoming call using the CID data. Usually, the device will place a return call using the same telephone number embedded in the CID data. Sometimes, however, the person who originates the call prefers to be called back at a different telephone number. For example, an incoming call may originate from a central, electronic switchboard whose number is the general number of a law firm. The person receiving the call may only know one person at the law firm and also knows that the caller prefers to have her calls returned using a "direct" telephone number, instead of using the general firm number. Other times, incoming calls may originate from wireless telephones though the caller may prefer calls be returned using a non-wireless telephone number. Existing CID devices do not allow for the use of a different number, a "preferred" call back number; the only number which can be used to place a return call is the number embedded in the CID data, which may not be a preferred call back number.

Accordingly, it is an object of the present invention to provide for communications devices, methods and programmed devices which select preferred call back numbers associated with incoming CID data in order to place return calls and the like to an original caller.

Other objectives, features and advantages of the present invention will become apparent to those skilled in the art from the following description taken in conjunction with the accompanying drawings.

SUMMARY OF THE INVENTION

In accordance with embodiments of the present invention there are provided devices and methods for selecting preferred call back numbers associated with CID data. One embodiment comprises a communications device which comprises: a receiver or receiving means for receiving a first incoming signal comprising CID data; a selection unit or selection means for selecting a list of preferred call back numbers; and a transmission unit or transmission means for transmitting an outgoing signal comprising a first preferred call back number chosen from the list of call back numbers. The first preferred call back number may comprise a telephone, voice, facsimile, wireless device or wireless telephone number associated with an identifier in the received CID data and the identifier may comprise a communications number or a name. Likewise, the communications number may comprise a telephone, voice, facsimile, wireless device, wireless telephone number or any other number generally referred to as a "telephone" number. As used hereafter, the words "voice number" will refer to a telephone number associated with an audio signal whereas the words "telephone number" will be used to refer to the wide array of signals sent using such a number to identify the source of the signal. Both a voice number and telephone number are included as communication numbers. The first preferred call back number may or may not comprise a number which is identical to a communications number embedded in the CID data.

Other embodiments comprise a display unit or means for displaying the list of preferred call back numbers, where the first preferred call back number is chosen from the displayed list of call back numbers; an input/output unit or means for inputting the list of preferred call back numbers; and a call back memory or memory means for storing the list of preferred call back numbers.

Other embodiments comprise devices where the receiver or receiving means is further adapted to receive a second incoming signal, where the second incoming signal may comprise a busy signal, answering machine pick-up signal or the like; and where the transmission unit is further adapted to transmit an outgoing signal comprising a next preferred call back number. As with the first preferred call back number, the next preferred call back number may comprise a telephone, voice, facsimile, wireless device or wireless telephone number and may or may not comprise a number which is identical to a communications number embedded in CID data. The next preferred call back number is taken from a list of preferred call back numbers which also contains the first preferred call back number.

In accordance with other embodiments of the present invention there are provided preferred methods for carrying out the invention along the lines just discussed.

In accordance with still other embodiments of the present invention, programmed devices are provided for selecting preferred call back numbers associated with CID data. These preferred devices comprise: program memory means for storing program code means, the program code means comprising: program code means for selecting a list of preferred call back numbers associated with an identifier in a first incoming signal which comprises CID data; and program code means for transmitting an outgoing signal comprising a first preferred call back number chosen from the list of preferred call back numbers. As before, the first preferred call back number may comprise a telephone, voice, facsimile, wireless device or wireless telephone number and may or may not comprise a number which is identical to a communications number embedded in the CID data. The identifier may comprise a portion of the CID data, such as a communications number or name and the communications number may comprise a telephone, voice, facsimile, wireless device or wireless telephone number.

Other embodiments comprise program code means for displaying the list of preferred call back numbers, where the first preferred call back number is chosen from the displayed list of call back numbers.

Additional embodiments include: programmed devices where the program code means for transmitting further comprises program code means for transmitting an outgoing signal comprising a next preferred call back number and where the second incoming may comprise a busy signal, an answering machine pick-up signal or the like; and programmed devices which utilize a name identifier instead of a communications number.

The present invention and its advantages can be best understood with reference to the drawings, detailed description of the preferred embodiments and claims that follow.

DETAILED DESCRIPTION OF THE INVENTION

The present invention can best be described by referring to a number of examples. These examples will illustrate the features of the present invention, but in no way are intended to limit the scope of the present invention.

Figure 1:
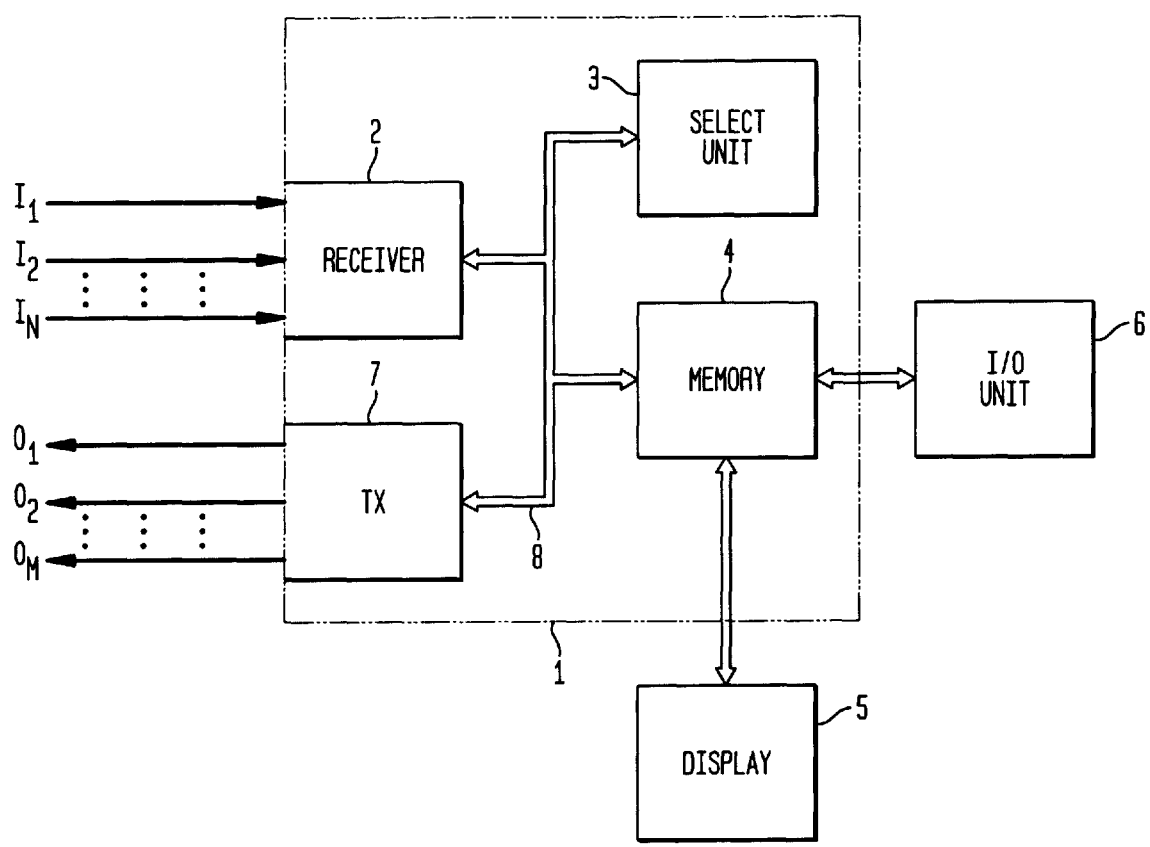
FIG. 1 depicts a communications device that selects preferred call back numbers associated with incoming CID data according to one embodiment of the present invention.

One example, or embodiment, of the present invention is shown in FIG. 1.

A communications device 1 is shown receiving incoming signals $I_1, I_2, \ldots I_N$ and transmitting output signals $O_1, O_2 \ldots O_M$. The incoming signals $I_1, I_2 \ldots I_N$ will be referred to as a first incoming signal, second incoming signal and "nth" incoming signal respectively. Likewise, the output signals $O_1, O_2 \ldots O_m$ will be referred to as a first output signal, second output signal and "mth" output signal respectively.

The device 1 comprises a receiver or receiving means 2 for receiving the incoming signals or calls $I_1, I_2 \ldots I_N$; selection unit or selection means 3 for selecting lists of preferred call back numbers; call back memory unit or memory means 4 for storing the preferred call back numbers; a display unit or display means 5 for displaying the selected preferred call back numbers; input/output unit ("I/O") or means 6 for inputting or deleting preferred call back numbers; and transmission unit or transmission means 7 for transmitting the output signals or return calls $O_1, O_2 \ldots I_M$. The I/O unit 6 may be further adapted to output a preferred call back number from the display unit 5.

The first incoming signal $I_1$ comprises a number of different signals. For example, if $I_1$ is an audio signal it will comprise the aural or audio signals which are responsible for "carrying" the voice of a caller who originated $I_1$. $I_1$ may also comprise CID data. Among other things, this CID data comprises data which identifies device which originated $I_1$ and the name associated with the originating device. Many times the device which originates $I_1$ will be a desk top telephone set. It should be understood that the incoming signal $I_1$ may comprise any number of communications signals, including a telephone number, voice number, facsimile number or data communications number used to connect to a computer. In general, incoming signals $I_1, I_2 \ldots I_N$ and output signals $O_1, O_2 \ldots O_M$ may comprise any number of different communications signals as well.

Upon reception, the incoming signal $I_1$ is routed to selection unit 3 via internal bus 8 or the like. The CID data embedded in $I_1$ is also routed to the selection unit 3. The selection unit 3 then selects a list of preferred call back numbers associated with the CID data in incoming signal $I_1$ from memory 4. These call back numbers are then sent to display unit 5 where they are usually displayed and can be seen by a user of device 1. The selection unit 3 may comprise a controller, digital signal processor, microprocessor or the like and may be programmed to make this selection using a program written in a code known to those in the art or may comprise one or a number of separate electronic components to carry out the selection. Once the list of preferred call back numbers has been selected and displayed, the user may then choose one of the displayed call back numbers, a "first" preferred call back number, via I/O unit 6 which may comprise a keyboard or the like adapted to select a displayed call back number. In one embodiment of the invention, once a call back number is chosen the number is then transmitted or dialed via the transmission unit 7. In another embodiment, if the list of preferred call back numbers comprises only one call back number, this number may be simultaneously displayed by the display unit 5 and output via transmission unit 7. This first preferred call back number represents the first number which is used to place a return call, e.g. telephone call, to the originator of incoming call $I_1$. It should be noted that responding to the originator of incoming call or signal $I_1$ may be accomplished by placing a return call to a device other than the device originally used to place incoming call $I_1$. As mentioned above, the lists of preferred call back numbers may be input by a user of device 1 via I/O unit 6. Once input, the call back numbers may be stored in call back memory 4.

Continuing, transmission unit 7 will transmit a first output signal $O_1$ which comprises tones or pulses for dialing the first preferred call back number. Thus, once a preferred number is selected from the display unit 5, the call back number is dialed without the user having to dial the number manually. Once the number is dialed and the call goes through, the connection proceeds as usual. The first preferred call back number may comprise a number of communication numbers or signals, such as a telephone, voice, facsimile, wireless device, e.g., wireless telephone.

In many instances transmission of a first preferred call back number by device 1 will be all that is required in order to respond to the source of incoming call or signal $I_1$. Other times, more will be required. For instance, if a device associated with the first preferred call back number is busy then the device 1 may attempt to reach a different device using a "next" preferred call back number.

In an alternative embodiment of the present invention, the receiver or receiving means 2 is further adapted to receive a second incoming signal, $I_2$. This second incoming signal $I_2$ may comprise a busy signal, an answering machine pick-up signal, or similar signal which is designed to indicate that a far-end receiving party is not able to answer the return call. Once the second incoming signal $I_2$ is detected, the device 1 "flashes" the line by means known in the art, and selection unit 3 is again triggered to select the preferred list of call back numbers stored in memory 4. Once the list is selected, it is again displayed on display 5. A user then selects a next preferred call back number from the displayed list via I/O unit 6 which is adapted to make such a selection. After selection, the next preferred call back number is output via transmission unit 5 which is adapted to output the next preferred call back number as output signal $O_2$. As before, if the list comprises only one next preferred call back number, then the next preferred call back number is simultaneously output via the transmission unit 7 as output signal $O_2$ at the same time as it is displayed on display 5.

The first and next preferred call back numbers are taken from the same list. In reality, this "list" may comprise a number of lists stored throughout memory 4 or in another storage device. As was the case with the first preferred call back number, the next preferred call back number may comprise a number of communications numbers or signals, such as a telephone, voice, facsimile, wireless device, e.g., wireless telephone.

Upon output of output signal $O_2$, the device 1 may still receive a busy signal or the like. If this occurs the device 1 may continue to select the next preferred call back number for output as an output signal $O_M$ until a successful connection is made, or until all of the preferred call back numbers have been exhausted, or until a user decides to stop placing (i.e., attempting to place) a return call by failing to select a next preferred call back number or just hanging up.

As was mentioned initially, the preferred call back numbers may be selected from lists or the like by the user. Selection unit 3 is initially responsible for selection of the lists from memory 4. Selection unit 3 must first receive CID data or the like which is embedded, or otherwise a part of, the incoming signal $I_1$. The memory unit 4 may be programmed with preferred call back numbers in a way similar to programming telephone numbers into a standard telephone memory or by some other means well known in the art. For example, the preferred call back numbers may be stored by pressing a "stored preferred call back" button located on device 1. In addition to displaying the preferred call back numbers, the display unit 5 may also display the original incoming number associated with the CID data. It should be understood, that even though a user may select a preferred call back number, such a number will not be transmitted unless the device 1, e.g., telephone, is "off-hook."

One list may be associated with the portion of the CID data which identifies a communications number, e.g., voice number, while another list may be associated with the portion of the CID data which identifies the "name" of the calling party, to name just two examples. The communications number and name are therefore "identifiers" because they identify some characteristic of the incoming signal $I_1$. Thus, the selection unit 3 may select a list of preferred call back numbers associated with the "name" embedded in the CID data or a list associated with the "communications number" embedded in the CID data. Even though the selection unit 3 may use a different identifier to select a list of preferred call back numbers, the operation of device 1 remains substantially the same as described above.

For instance, suppose John Smith originates an incoming call or signal $I_1$ from his home. Any such call or signal $I_1$ would include as a part of the associated CID data, the same "name" identifier representing John Smith. This "name" identifier embedded in CID data can be linked to many communications numbers. That is to say, a return call may be placed to John's home voice number, office voice number or facsimile number using an appropriately stored preferred call back number.

It should be understood that the present invention envisions embodiments where the first preferred call back number or subsequent, next preferred call back numbers are different numbers than the communication number embedded in the CID data as well as embodiments where any of the preferred call back numbers may be identical to the number. For example, the embedded number may be a number indicating that the incoming call or signal $I_1$ originated as an output from a facsimile machine where a user temporarily uses the facsimile line to place the call, while the first preferred call back number may be a voice number associated with a voice, not facsimile device, indicating that the caller prefers to have a output signal or response $O_1$ transmitted to her using her voice number. Similarly, the embedded number and the preferred call back numbers may both be voice numbers, but the numbers themselves may be different. The list of preferred call back numbers may comprise the embedded number as an alternative call back number.

The receiver 2, selection unit 3, memory 4, display unit 5, I/O unit 6 and transmission unit 7 are shown as separate components. The advantages of the present invention may be realized by many alternative embodiments. To this end, it should be understood that these components are shown as functional blocks. Alternate embodiments, where these components are combined or further broken down into additional functional blocks, are within the scope of the present invention.

Figure 2:
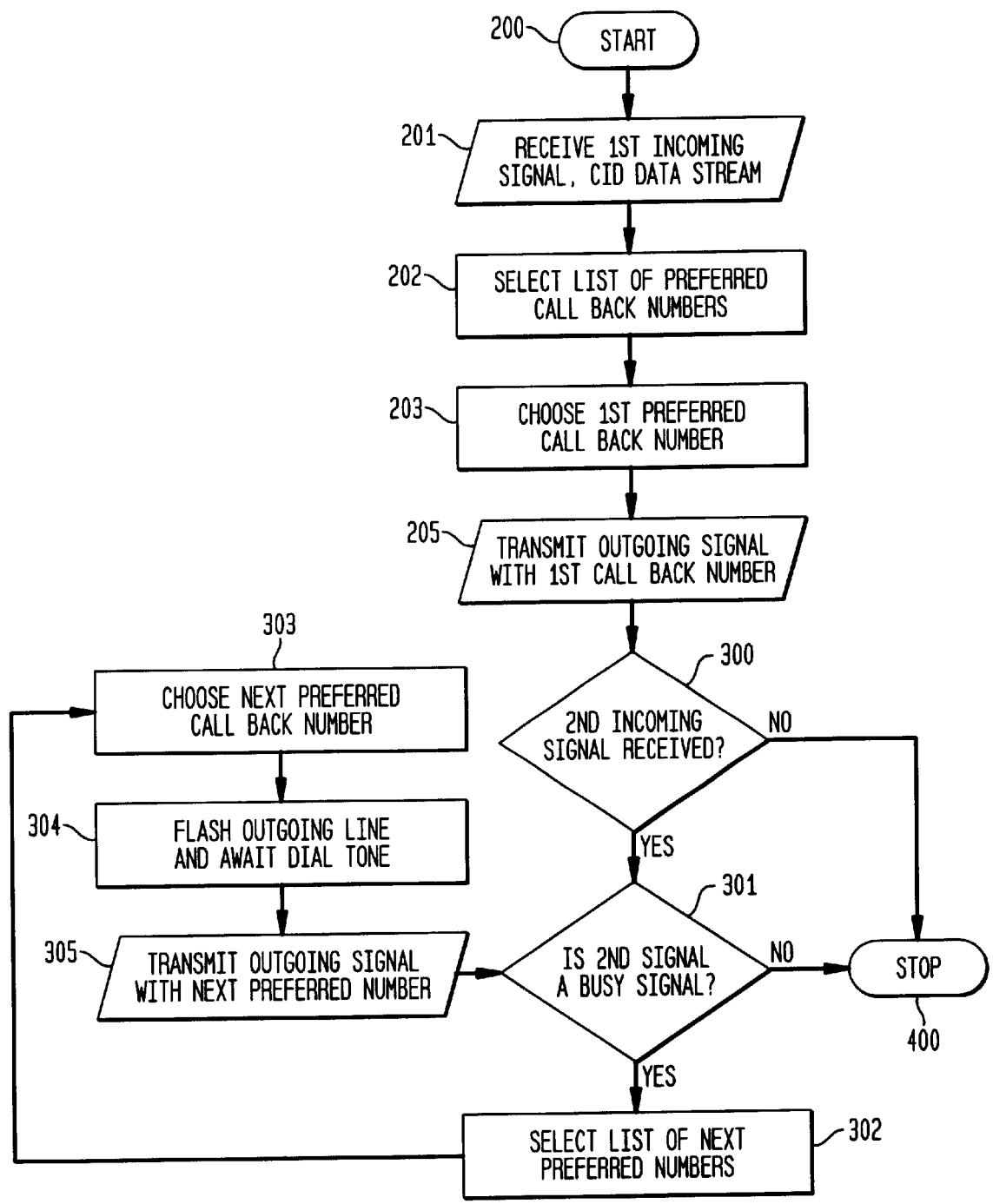
FIG. 2 depicts a flow chart of methods for selecting preferred call back numbers associated with incoming CID data according to another embodiment of the present invention.

Turning now to FIG. 2, there is depicted a flow chart of methods for selecting preferred call back numbers from incoming CID data according to another embodiment of the present invention which utilize the steps laid out above.

It should be understood that these methods may be carried out using a number of devices, such as the device shown in FIG. 1, a telephone answering device ("TAD"), a larger system such as a communications central office, e.g., a telephone central office or the like.

Figure 3:
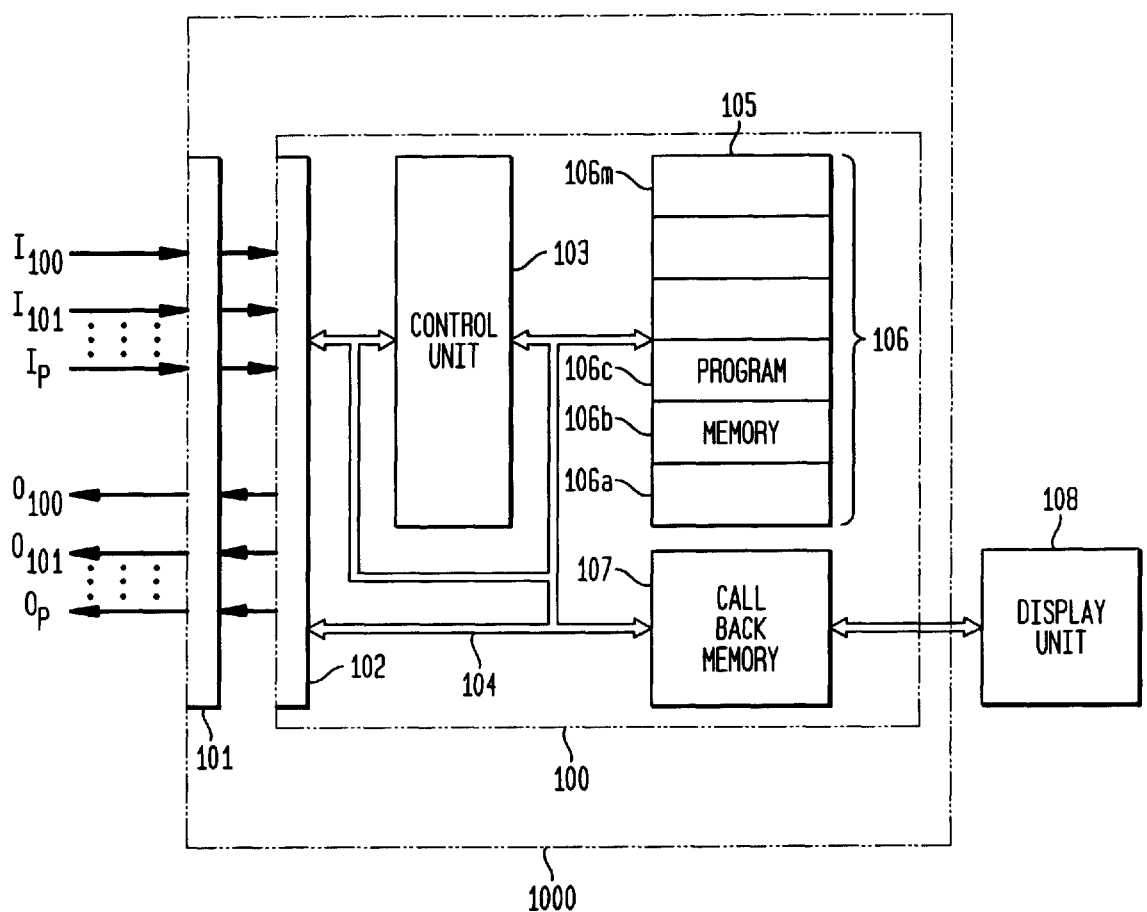
FIG. 3 depicts a programmed device for selecting preferred call back numbers from incoming CID data according to another embodiment of the present invention.

Many of the functions of the device shown in FIG. 1 may be carried out by a programmed device 100 shown in FIG. 3 according to yet another embodiment of the present invention. An example of how the programmed device 100 may operate to realize the advantages of the present invention is as follows.

The programmed device 100 may be a part of larger device or system 1000 or may be a standalone device. In one embodiment shown in FIG. 3, the programmed device 100 is a part of a larger device or system 1000. This larger device or system 1000 may comprise a telephone, TAD, telephone central office or the like. Incoming signals $I_{100}, I_{101} \ldots I_P$ are received by receiver-input/output unit or receiving means 101 of device 1000. Thereafter, the signals are received by an input/output unit or another receiver 102. Though two separate receivers or input/output units 101,102 are shown, one may suffice depending on the design selected by one skilled in the art.

First incoming signal $I_{100}$ comprises a number of signals, among them CID data or the like. Control or selection unit 103 is notified via bus 104 that the first incoming signal $I_{100}$ has been received. This control unit 103 is used to select a program 106 which is stored in program memory or memory means 105. The program 106 farther comprises program code or program code means 106a,b,c . . . m. More specifically, the control unit 103 selects specific program code 106a,b,c . . . m upon receiving, for example, a notification, interrupt or similar signal via bus 104. In one embodiment, the control unit 103 selects program code means 106a for selecting preferred call back numbers associated with an identifier in the CID data from preferred call back memory or memory means 107. The identifier in the CID data may comprise a portion of the data such as a communications number or "name".

The communications number embedded in the first incoming signal $I_{100}$ may comprise a telephone, voice, facsimile, wireless device or wireless telephone number or the like.

After selection of the call back numbers, the control unit 103 selects program code means 106b for displaying preferred call back numbers on display 108. Similar to the discussion of the device in FIG. 1, once the call back numbers are displayed, the control unit 103 will next select program code 106c for transmitting or outputting an outgoing signal $O_{100}, O_{101}, \ldots O_P$ representing a selected, first preferred call back number once the device 100 or 1000 has received an incoming signal indicating which call back number has been selected by a user.

Alternatively, if only one preferred call back number for a given incoming signal $I_P$ is stored in memory 107, then the program code 106b may be adapted to simultaneously output the lone preferred call back number as an output signal $O_P$ as it is displayed. The first preferred call back number may comprise a telephone, voice, facsimile, wireless device, wireless telephone number or the like. As before, the first preferred call back number may or may not be the same as the communications number embedded in the received CID data. For example, the first preferred call back and communications numbers may be voice numbers, but the voice numbers may be different. In another embodiment the number embedded in the CID data may be a facsimile number while the first preferred call back number may be a voice number. Finally, as was true with the embodiments based on FIG. 1 and the description above, both the embedded number, e.g., communications number, and preferred call back numbers may be identical.

At this point, the programmed device 100 has selected and transmitted a first preferred call back number. The device addressed by this preferred call back number, however, may be busy. In another embodiment of the invention, the program code means 106c for transmitting may further comprise program code means for transmitting a next preferred call back number upon reception of a second incoming signal, $I_{101}$. This second incoming signal $I_{101}$ may comprise a busy signal or an answering machine pick-up signal. In either case, after this second incoming signal $I_{101}$ is received by the programmed device 100 or device 1000, the control unit 103 selects program code means 106a which is further adapted, or further comprises, code for selecting next preferred call back numbers from memory 107. Thereafter, the control unit 103 selects program code means 106b which is also further adapted, or further comprises, code for displaying the next preferred call back numbers. Again, as before, once one of the numbers is selected, the control unit 103 selects program code means 106c which is further adapted, or further comprises, code for outputting the next preferred call back number as output signal $O_{101}$. It should be understood that the program code or code means related to each of the next preferred call back numbers may be derived from an adaption of the program code used for the first preferred call back number or from separate code. For ease of understanding, the present explanation uses the former.

Like the first preferred call back number, the next preferred call back number is taken from the same list stored in memory 107.

The programmed device 100 will continue to select additional program code to control the transmission of next preferred call back numbers as long as a busy signal is received, until all of the preferred call back numbers in memory 107 have been exhausted, or until the user of device 1 decides to hang up or cease trying to place an outgoing phone call.

It should be understood that, with respect to the embodiments exemplified by FIG. 3, as in prior embodiments, other data or identifiers in the CID data may be used to select preferred call back numbers. The "name" identifier is one such identifier. In one embodiment, a name identifier embedded in the CID data may be associated with separate preferred call back numbers. In another embodiment, the embedded name may be associated with numbers that are already associated with communication number identifiers. Said another way, the same preferred call back numbers may be associated with more than one identifier embedded in CID data.

Returning to the programmed device 100, a name identifier may be used to select program code means for selecting both first and next preferred call back numbers and for selecting program code means for transmitting both first and next preferred call back numbers. In other respects, embodiments which utilize a name instead of a communications number as an identifier function in substantially the same way.

The control unit 103, program memory 105, call back memory 107, input/output units 101,102 and display unit 108 are shown in FIG. 3 as functional blocks. Alternate embodiments, where these components are combined or further broken down into additional functional blocks, are within the scope of the present invention.

It is to be understood that changes and variations may be made without departing from the spirit and scope of this invention as defined by the claims that follow.

We claim:

1. A communication device comprising:
a receiver configured to receive embedded caller identity data (CID) data;
a selection unit adapted to select a list of preferred call back numbers associated with a number identifier in the received CID data wherein the numbers need not include a value which matches the identifier; and
a transmission unit adapted to transmit an outgoing signal comprising a first preferred call back number chosen from the list of call back numbers.

2. The device as in claim 1 further comprising a display unit adapted to display the list of preferred call back numbers.

3. The device as in claim 2 wherein the first preferred call back number is chosen from the displayed list of call back numbers.

4. The device as is in claim 1 further comprising an input/output unit adapted to input the list of preferred call back numbers.

5. The device as in claim 1 further comprising a call back memory unit adapted to store the list of preferred call back numbers.

6. The device as in claim 1 wherein the first preferred call back number comprises a telephone number.

7. The device as in claim 1 wherein the first preferred call back number comprises a facsimile number.

8. The device as in claim 1 wherein the first preferred call back number comprises a voice number.

9. The device as in claim 1 wherein the first preferred call back number comprises a wireless telephone number.

10. The device as in claim 1 wherein the identifier comprises a communications number.

11. The device as in claim 10 wherein the first preferred call back number comprises a number identical to the communications number.

12. The device as in claim 1 wherein the receiver is further adapted to receive a second incoming signal.

13. The device as in claim 12 wherein the second incoming signal comprises a busy signal.

14. The device as in claim 12 wherein the second incoming signal comprises an answering machine pick-up signal.

15. The device as in claim 12 wherein the transmission unit is further adapted to transmit an outgoing signal comprising a next preferred call back number chosen from the list of call back numbers.

16. The device as in claim 1 wherein the identifier comprises a name.

17. A communications device comprising:
receiving means for receiving a first incoming signal comprising embedded CID data;

selection means for selecting a list of preferred call back numbers associated with a number identifier in the received CID data wherein the numbers need not include a value which matches the identifier; and transmission means for transmitting an outgoing signal comprising a first preferred call back number chosen from the list of call back numbers.

18. The device as in claim 17 further comprising display means for displaying the list of preferred call back numbers.

19. The device as in claim 18 wherein the first preferred call back number is chosen from the displayed list of call back numbers.

20. The device as in claim 17 further comprising input/output means for inputting the list of preferred call back numbers.

21. The device as in claim 17 further comprising memory means for storing the list of preferred call back numbers.

22. The device as in claim 17 wherein the first preferred call back number comprises a telephone number.

23. The device as in claim 17 wherein the first preferred call back number comprises a facsimile number.

24. The device as in claim 17 wherein the first preferred call back number comprises a voice number.

25. The device as in claim 17 wherein the first preferred call back number comprises a wireless telephone number.

26. The device as in claim 17 wherein the identifier comprises a communications number.

27. The device as in claim 26 wherein the first preferred call back number comprises a number identical to the communications number.

28. The device as in claim 17 wherein the receiving means is further adapted to receive a second incoming signal.

29. The device as in claim 28 wherein the second incoming signal comprises a busy signal.

30. The device as in claim 28 wherein the second incoming signal comprises an answering machine pick-up signal.

31. The device as in claim 28 wherein the transmission means is further adapted to transmit an outgoing signal comprising a next preferred call back number chosen from the list of call back numbers.

32. The device as in claim 17 wherein the identifier comprises a name.

33. A method for selecting preferred call back numbers using CID data comprising:

receiving a first incoming signal comprising embedded CID data;

selecting a list of preferred call back numbers associated with a number identifier in the received CID data wherein the numbers need not include a value which matches the identifier; and transmitting an outgoing signal comprising a first preferred call back number chosen from the list of preferred call back numbers.

34. The method as in claim 33 further comprising displaying the list of preferred call back numbers.

35. The method as in claim 34 further comprising choosing the first preferred call back number from the list of displayed call back numbers.

36. The method as in claim 33 further comprising inputting the list of preferred call back numbers.

37. The method as in claim 33 further comprising storing the list of preferred call back numbers.

38. The method as in claim 33 wherein the first preferred call back number comprises a telephone number.

39. The method as in claim 33 wherein the first preferred call back number comprises a facsimile number.

40. The method as in claim 33 wherein the first preferred call back number comprises a voice number.

41. The method as in claim 33 wherein the first preferred call back number comprises a wireless telephone number.

42. The method as in claim 33 wherein the identifier comprises a communications number.

43. The method as in claim 42 wherein the first preferred call back number comprises a number identical to the communications number.

44. The method as in claim 33 further comprising receiving a second incoming signal.

45. The method as in claim 44 wherein the second incoming signal comprises a busy signal.

46. The method as in claim 44 wherein the second incoming signal comprises an answering machine pick-up signal.

47. The method as in claim 44 further comprising transmitting an outgoing signal comprising a next preferred call back number chosen from the list of call back numbers.

48. The method as in claim 33 wherein the identifier comprises a name.

49. A programmed device comprising program memory means for storing program code means, the program code means comprising;

program code means for selecting a list of preferred call back numbers associated with a number identifier in a first incoming signal comprising embedded CID data wherein the numbers need not include a value which matches the identifier; and program code means for transmitting an outgoing signal comprising a first preferred call back number chosen from the list of preferred call back numbers.

50. The programmed device as in claim 49 further comprising program code means for displaying the list of preferred call back numbers.

51. The programmed device as in claim 50 wherein the first preferred call back number is chosen from the displayed list of call back numbers.

52. The programmed device as in claim 49 wherein the first preferred call back number comprises a telephone number.

53. The programmed device as in claim 49 wherein the first preferred call back number comprises a facsimile number.

54. The programmed device as in claim 49 wherein the first preferred call back number comprises a voice number.

55. The programmed device as in claim 49 wherein the first preferred call back number comprises a wireless telephone number.

56. The programmed device as in claim 49 wherein the identifier comprises a communications number.

57. The programmed device as in claim 56 wherein the first preferred call back number comprises a number identical to the communications number.

58. The programmed device as in claim 49 wherein the program code means for selecting further comprises program code means for selecting the list of preferred call back numbers after receipt of a second incoming signal.

59. The programmed device as in claim 58 wherein the second incoming signal comprises a busy signal.

60. The programmed device as in claim 58 wherein the second incoming signal comprises an answering machine pick-up signal.

61. The programmed device as in claim 58 wherein the program code means for transmitting further comprises program code means for transmitting an outgoing signal comprising a next preferred call back number chosen from the list of call back numbers.

62. The programmed device as in claim 49 wherein the identifier comprises a name.

\* \* \* \* \*